United States Patent

Hall

[15] 3,704,829
[45] Dec. 5, 1972

[54] JET NOZZLE
[72] Inventor: John Matthew Hall, Bristol, England
[73] Assignee: Sectretary of State for Defense in Her Britainnic Majesty's Government of the United Kingdom of Great Britain & North Ireland, Whitehall, London, England
[22] Filed: July 21, 1971
[21] Appl. No.: 164,794

[30] Foreign Application Priority Data

July 31, 1970    Great Britain..........37,062/70

[52] U.S. Cl...............................239/265.35, 60/230
[51] Int. Cl................................................B64c 15/04
[58] Field of Search.......239/265.19, 265.27, 265.33, 239/265.35, 265.37, 265.39; 60/228, 230

[56] References Cited

UNITED STATES PATENTS

| | | |
|---|---|---|
| 2,951,660 | 9/1960 | Giliberty...............239/265.33 |
| 3,178,887 | 4/1965 | Wilde et al. ..........239/265.35 |
| 3,266,733 | 8/1966 | Goehler............239/265.35 X |
| 3,380,660 | 4/1968 | Markowski...........239/265.27 |
| 3,531,940 | 10/1970 | Markowski..................60/230 |

FOREIGN PATENTS OR APPLICATIONS

| | | | |
|---|---|---|---|
| 1,119,126 | 12/1961 | Germany | ..............239/265.37 |

Primary Examiner—M. Henson Wood, Jr.
Assistant Examiner—Thomas C. Culp, Jr.
Attorney—Stevens, Davis, Miller & Mosher

[57] ABSTRACT

A jet nozzle for thrust vectoring has a jet pipe, at the downstream end of which are a plurality of part spherical segments which are movable from a nested position around the jet pipe into a position in which they deflect the stream of exhaust gases from the jet pipe. The movement is effected by a chain which is pushed and pulled by a linear actuator, the chain links having abutments thereon which limit the amount of flexing of the chain to a radius determined by movement of the outermost segment.

1 Claim, 5 Drawing Figures

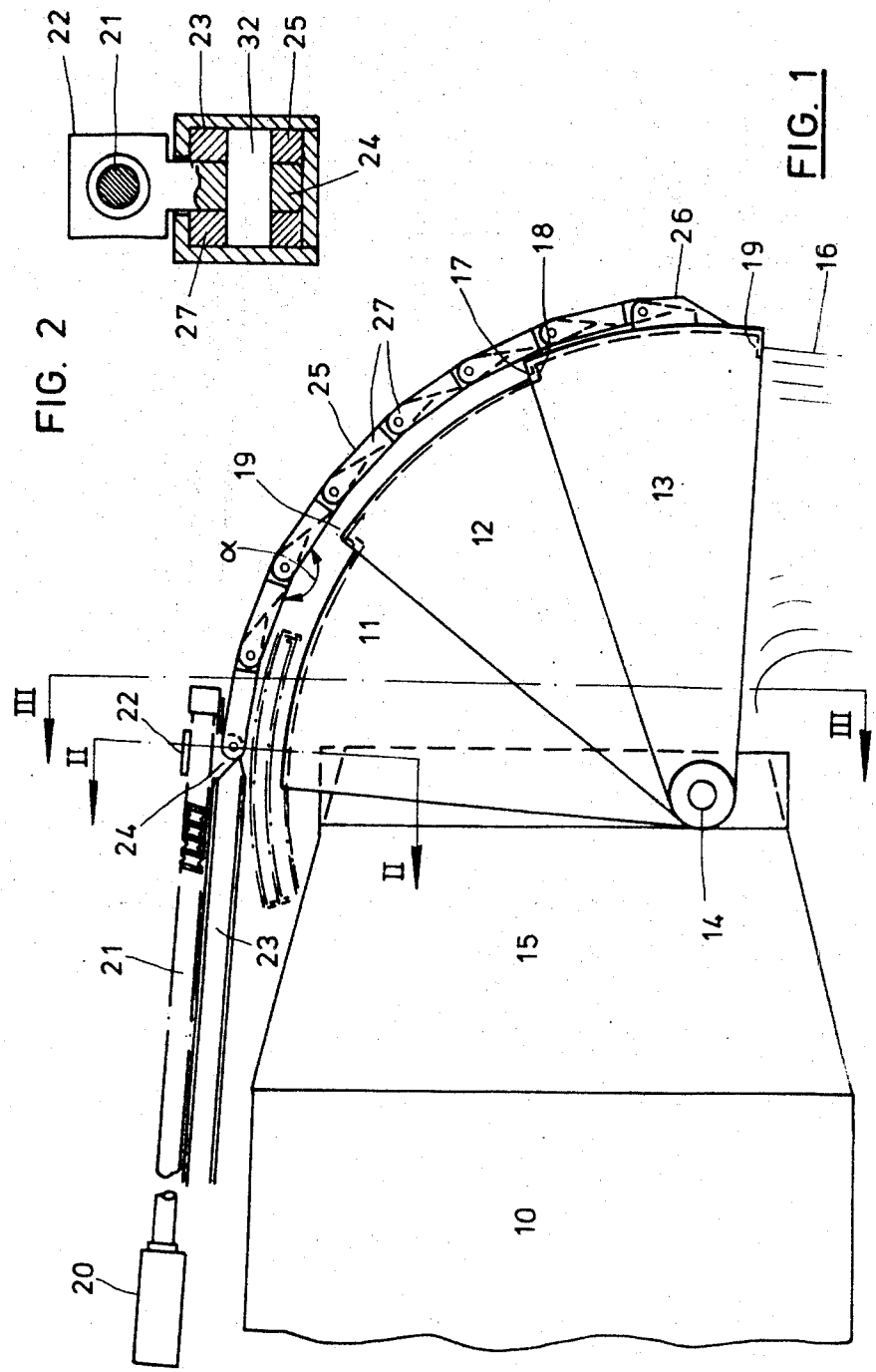

JET NOZZLE

This invention relates to a jet nozzle for gas turbine engines.

According to this invention a jet nozzle for a gas turbine engine comprises a jet pipe for the flow of combustion products of the engine, a plurality of hollow sphere segments of different radius connected to a common pivot on the jet pipe and capable of being moved between a position in which they are nested around the downstream end of the jet pipe and a position in which they are extended to form a curved extension of the jet pipe for the purpose of diverting the jet flow from the direction determined by the jet pipe itself, a chain connected between the outermost of the segments, and a linear actuator fixedly supported in relation to the jet pipe so that when the chain is pushed by the actuator the segments are moved from the nested to the extended position and vice versa, the chain comprising links including abutments limiting the flexing of the chain away from the straight to a radius determined by the movement of said outermost segment.

An example of a nozzle according to this invention will now be described with reference to the accompanying drawings wherein:

FIG. 1 is a side elevation of the nozzle shown in an extended position.

FIG. 2 is an enlarged section on the line II—II in FIG. 1.

Figure 3:
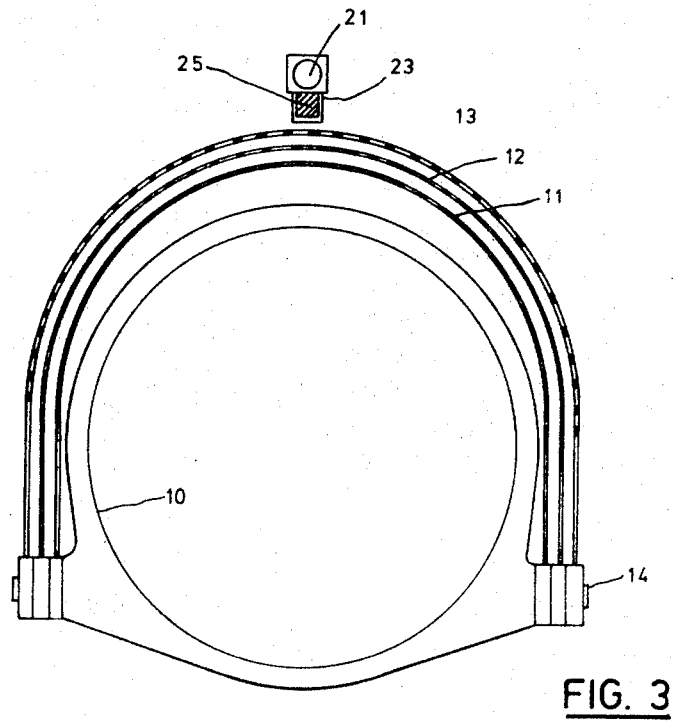
FIG. 3 is a view on the line III—III in FIG. 1 but showing the nozzle in a contracted position.

Referring to the drawings, there is provided a jet pipe 10 having a convergent terminal portion 15 and three hollow sphere segments 11, 12, 13 of different radius and supported on a common pivot 14 on the jet pipe. The segments are movable between the extended position shown in full lines and a nested position indicated in broken lines. In the nested position of the segments the flow of gas from the jet pipe issues in a direction determined by the terminal portion 15. In the extended position of the segments the gas flow is diverted downwards as shown at 16. The segments have abutments 17, 18 so that if the outermost segment 13 is moved from the nested to the extended position the other segments are caused to follow, and abutments 19 arranged so that if the segment 13 is retracted the other segments are likewise caused to follow.

Above the jet pipe there is provided a linear actuator in the form of an air motor 20 adapted to rotate a screw 21 so as to move a nut 22 along a hollow track or guide 23. The nut has a lug 24 protruding into the guide and connected to one end of a chain 25 the other end of which is connected to a lug 26 on the segment 13, which segment constitutes a pivotal arm for transmitting motion by means of the chain.

If the motor is actuated to move the nut in the direction towards the motor the chain is being pulled into the guide and the segments are moved into the nested position. Movement of the motor in the opposite sense causes the chain to push the segments into the extended position.

Figure 5:
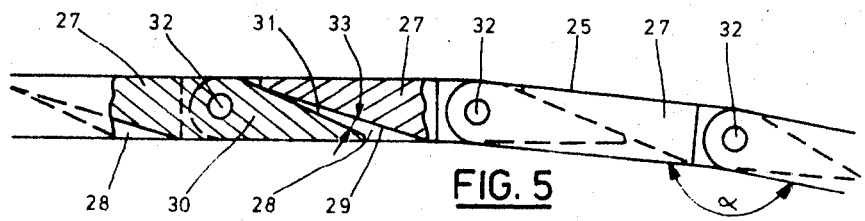
FIG. 5 is a partly sectioned elevation of FIG. 4.
Figure 4:
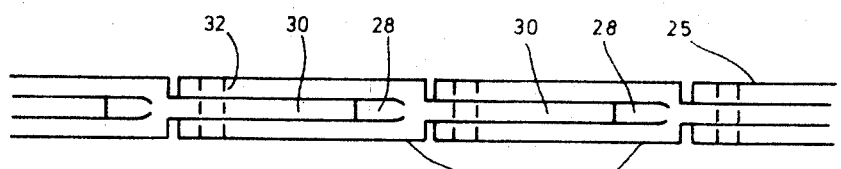
FIG. 4 is an enlarged plan view of the chain employed in the construction of the nozzle.

To ensure that the chain does not collapse when projecting from the guide, each chain link, denoted 27, comprises at one end a recess 28 (FIGS. 4,5) defining a surface 31 and at the other end a tongue defining a surface 31. Adjacent links are connected by pivots 32, and the recess 28 of each link lies between the two pivot points thereof while the tongue 30 lies beyond these pivot points. Thus that the tongue of one link engages the recess of the adjacent link and the surfaces 29,31 confront each other. The relationship between the surfaces 29,31 is such that when the chain is straight there is a gap 33 between them and if the chain is flexed in the sense causing that gap to be reduced then the eventual abutment of the surfaces 29,31 limits the angle $\alpha$ to which adjacent links can be pivoted. The dimensions are made such that when all the surfaces 29,31 of the chain are in engagement the chain takes up an arc as shown in FIG. 1 whose radius is equal to the radius swept by the lug 26 when the segment 13 is pivoted. The lug 26 has a recess similar to the links for engagement by the tongue of the adjacent link.

It will be seen that the chain, as connected between the lugs 24,26 and projecting from the guide 23, cannot be collapsed from said arc because such collapse would involve a reduction of the angle $\alpha$ between at least two of the links which, as described, is made impossible by the engagement of the tongues and recesses.

Further, it will be noted that the ability of the chain to maintain the arcuate position makes it possible not to have to use a guide around the arcuate part of the chain which guide would be exposed to the exhaust gases when the segments are retracted unless the arcuate guide is itself made segmented and retractable but to do that would disadvantageously add to the weight and complexity of the structure.

I claim:

1. A jet nozzle for a gas turbine engine comprising a jet pipe for the flow of combustion products of the engine, a plurality of hollow sphere segments of different radius connected to a common pivot on the jet pipe and capable of being moved between a position in which they are nested around the downstream end of the jet pipe and a position in which they are extended to form a curved extension of the jet pipe for the purpose of diverting the jet flow from the direction determined by the jet pipe itself, a chain connected between the outermost of the segments, and a linear actuator fixedly supported in relation to the jet pipe so that when the chain is pushed by the actuator the segments are moved from the nested to the extended position and vice versa, the chain comprising links including abutments limiting the flexing of the chain away from the straight to a radius determined by the movement of said outermost segment.

* * * * *